(12) United States Patent
Jane Santamaria

(10) Patent No.: US 9,266,549 B2
(45) Date of Patent: Feb. 23, 2016

(54) CHASSIS FOR BABY PUSHCHAIRS

(71) Applicant: JANE, S.A., Palau de Plagamans, Barcelona (ES)

(72) Inventor: Manuel Jane Santamaria, Palau de Plegamans (ES)

(73) Assignee: JANE, S.A., Palau de Plegamans (ES)

( * ) Notice: Subject to any disclaimer, the term of this patent is extended or adjusted under 35 U.S.C. 154(b) by 0 days.

(21) Appl. No.: 14/469,871

(22) Filed: Aug. 27, 2014

(65) Prior Publication Data

US 2015/0076796 A1    Mar. 19, 2015

(30) Foreign Application Priority Data

Sep. 19, 2013  (ES) .................. 201331082 U

(51) Int. Cl.
*B62B 7/06* (2006.01)
*B62B 7/10* (2006.01)

(52) U.S. Cl.
CPC ..... *B62B 7/10* (2013.01); *B62B 7/06* (2013.01); *B62B 2205/02* (2013.01); *B62B 2205/06* (2013.01); *B62B 2205/22* (2013.01); *B62B 2301/20* (2013.01)

(58) Field of Classification Search
CPC .......... B62B 7/06; B62B 7/062; B62B 7/064; B62B 7/068; B62B 7/08; B62B 7/086; B62B 9/18; B62B 7/10
See application file for complete search history.

(56) References Cited

U.S. PATENT DOCUMENTS

| | | | | |
|---|---|---|---|---|
| 3,504,925 | A | * | 4/1970 | Glaser Dieter ................. 280/650 |
| 4,111,454 | A | * | 9/1978 | Kassai ........................... 280/649 |
| 4,272,100 | A | * | 6/1981 | Kassai ........................... 280/650 |
| 4,386,790 | A | * | 6/1983 | Kassai ........................... 280/650 |
| 5,472,224 | A | * | 12/1995 | Jane Cabagnero ............ 280/642 |
| 5,765,855 | A | * | 6/1998 | Chiu ............................. 280/642 |
| 6,105,997 | A | * | 8/2000 | Watkins ........................ 280/649 |
| 6,312,005 | B1 | * | 11/2001 | Lin ............................... 280/647 |
| 2009/0014985 | A1 | * | 1/2009 | Huang .......................... 280/647 |
| 2010/0044164 | A1 | * | 2/2010 | Thorne ......................... 188/1.12 |
| 2010/0237591 | A1 | * | 9/2010 | Hartenstine et al. .......... 280/650 |

* cited by examiner

*Primary Examiner* — Frank Vanaman

(57) ABSTRACT

A foldable chassis for a child's pushchair that includes an inverted U-shaped handlebar mounted to a pair of side arms that are connected to a pair of front legs, a pair of rear legs, a scissor frame and two side cross members that link the front legs to the rear legs, and a locking compass connected between a pair of rear wheels, wherein each front leg is connected to a front wheel by an articulated section that is pivotally connected to the front leg and to an adjacent front wheel support to which a front wheel is mounted, so that, as the chassis is folded, the articulated sections reduce a length of the folded chassis.

2 Claims, 3 Drawing Sheets

CHASSIS FOR BABY PUSHCHAIRS

OBJECT OF THE INVENTION

More specifically, the present invention refers to a chassis for children's prams-pushchairs, that have their corresponding seat, carrycot or similar fitted and can fold to reduce their size.

STATE OF THE ART

There are different models of children's prams-pushchairs comprising a chassis to which a seat is fitted, carrycot-cot or similar elements, the assembly being foldable in width and height, to reduce the space they occupy, either for storage or transport.

These children's pushchairs have an articulation between the handlebar arm and the foot of the front wheel to fold from top to bottom.

In addition, to carry out the side folding of the chassis, it has a scissor frame and two side cross members that link the front feet to the rear, and a locking compass between the rear wheels, there may also be a rear scissor frame.

In the same manner, there are inverted "U"—shaped handlebars that have an articulation in the centre so the width of the chassis can be reduced.

SUMMARY OF THE INVENTION

This invention has a foldable chassis for a child's pushchair that has a handlebar arm and a front leg of greater structural rigidity, also reducing the length of this assembly as the chassis is folded.

This child's pushchair chassis has inverted "U" shaped handlebars that are joined continuously, without articulations, to the front legs of the same side of the chassis, providing greater structural rigidity to the side assembly of the chassis.

Having this continuous side assembly, to reduce the length of the pushchair chassis when folded, there is a link, by means of an articulated section, between the lower end of the leg and its wheel, this section being in turn articulated with regard to the front wheel support. In this manner, the length of the side assembly formed by the arm of the handlebar and its front wheel is reduced, without dividing this assembly with central articulation.

The articulation of the lower end of the front leg with said lower section has a locking system with a control for unlocking and it is activated to fold the chassis.

This system locking the articulation between the front leg and the lower section comprises in this lower section a retractable projection that is inserted into the lower end of the front leg, and by the action of down pressure from the handlebar, previously unlocking the general locking system, an inner element of the front leg moves and presses on these retractable projections moving them from their location in the front leg and enabling the folding. Thus it is folded by means of a forward pressure on the handlebar of the chassis.

The lower end of the rear legs is articulated to the side members (that link the front and rear wheels of one side of the chassis), by means of a linking piece, and it has suspension elements at the lower end of the rear leg and the support of the corresponding rear wheel, with a locking compass between the linking pieces of one side and the other. This system enables direct suspension to be fitted to the wheel fork, which is in turn articulated on the side cross member.

Other details and features will be described in the description below, referring to the three sheets of drawings that accompany this report, in which a practical application of the invention is presented as a non-exclusive example.

DESCRIPTION OF AN EMBODIMENT OF THE INVENTION

Figure 1:
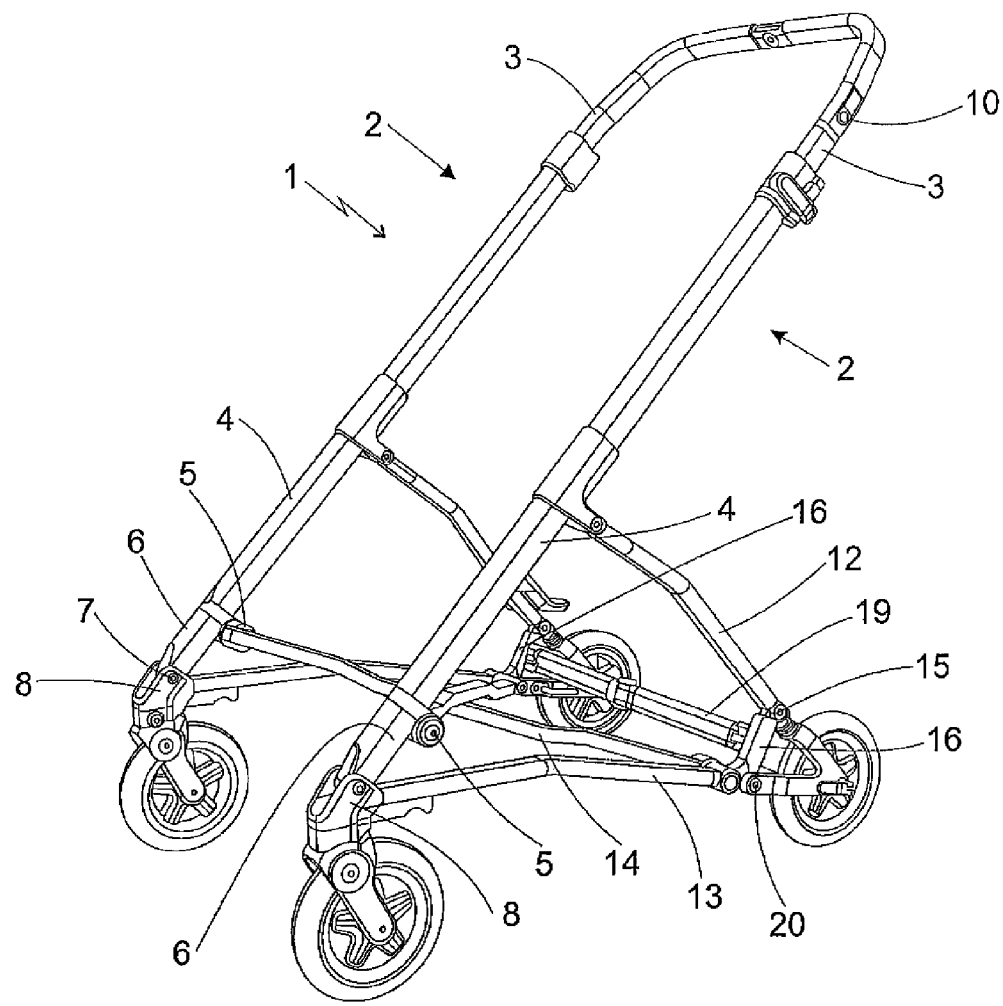
FIG. 1 is a perspective view of the pushchair frame in its unfolded position.
Figure 2:
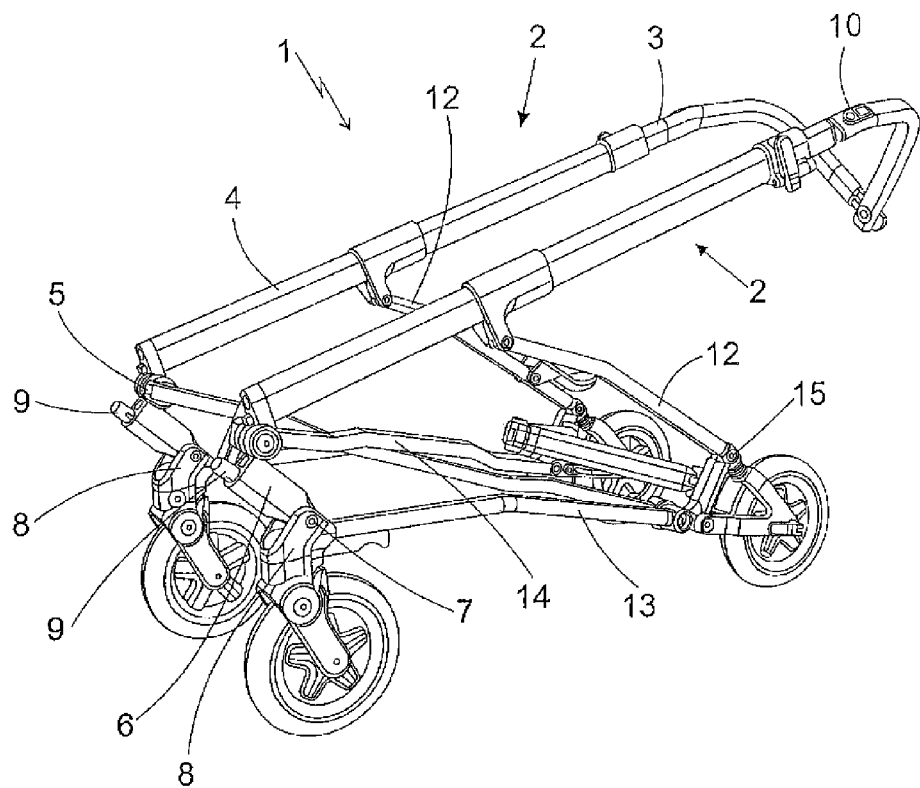
FIG. 2 is a perspective view of the pushchair frame in its partially folded position.
Figure 3:
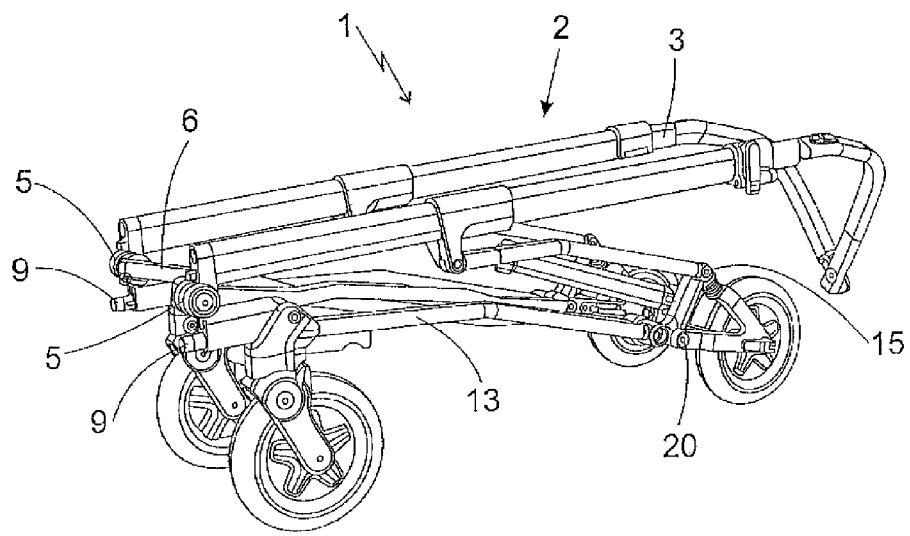
FIG. 3 is a perspective view of the pushchair frame in its folded position.
Figure 4:
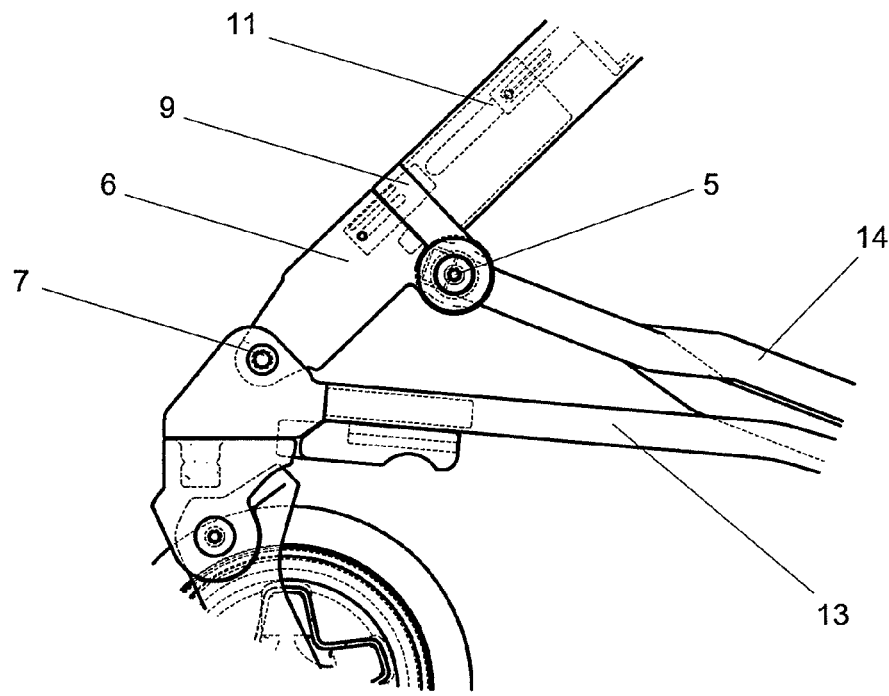
FIG. 4 is a detail of the locking system for the articulation between the front leg and the lower section.
Figure 5:
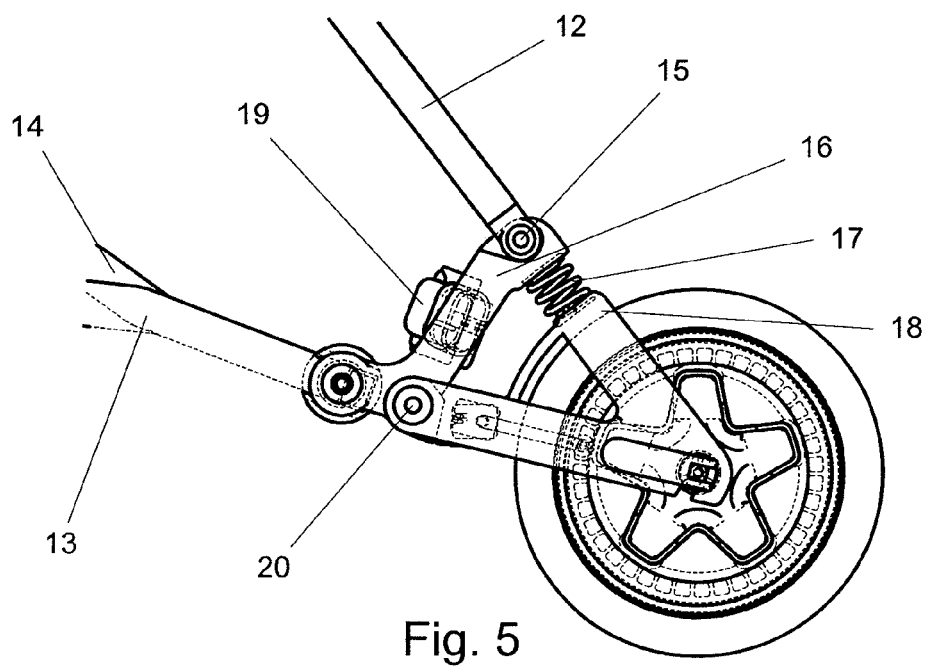
FIG. 5 is a detail of the linking piece at the lower end of the rear leg.

In this preferred embodiment of the invention, as can be seen in FIGS. 1 to 5, the chassis (1) of the pushchair on each of its sides has a side assembly (2) forming the arm of the handlebar (3) and the corresponding front foot (4).

This continuous side assembly (2) has an articulation (5) at its lower end, between the front leg (4) and a lower section (6) that in its unfolded position offers continuity to the side assembly (2), but on folding, it reduces the length of the chassis (1), this section (6) presenting in turn an articulation (7) with the wheel support (8), enabling the turning of the section (7) with regard to said support (8), for folding.

To lock this articulation (5) when the chassis (1) is unfolded, there is a locking system that in its lower section (6) has a retractable projection (9) that in unfolded position of chassis (1) is inserted into the lower end of the front leg (4), stopping it from rotating on the articulation (5).

The articulation (5) is released by pressing down on the handlebar, previously having unlocked the general locking system (10) and pressing the handlebar longitudinally, which moves an inner element (11) of the front leg (4) that presses on the retractable projections (9), displacing them from their location in the front leg (4) and enabling the folding.

The chassis (1) of the child's pushchair has two rear legs (12) that are articulated to the side assembly (2) for folding.

The front (4) and rear (12) legs are linked by cross members (13). This link between the front (4) and rear (12) wheels is also made with a scissor frame (14) that enables the chassis (1) to be folded in width.

The lower end of the rear legs (12) is joined by an articulation (15) to a linking piece (16) that extends the corresponding side members (13). This linking piece (16) has suspension (17) on the lower articulated end of the rear legs (12) and the rear wheel support (18). The rear wheel support (18) also has a second articulated linkage (20) with the joining piece (16).

Between the linking pieces (16) of one side and the opposite there is a locking compass (19) that is articulated for folding the width of the chassis (1).

In this manner, once the general chassis locking system (10) is released, on pressing the handlebar down longitudinally, it unlocks the articulation (5) of the front leg (4), folding the side assembly (2) from top to bottom together with the rear leg (12) articulated to the assembly (2). In turn, by means of the articulated handlebar, the scissor frame (14) and the compass (19), the chassis folds (1), reducing its width.

Having sufficiently described this invention, with correspondence to the attached drawings, it is easy to understand that any sort of modification deemed necessary can be introduced as long as they do not change the essence of the invention, which is summarised in the following claims:

The invention claimed is:

1. A foldable chassis for a child's pushchair comprising an inverted U-shaped handlebar having a pair of side arms mounted to a pair of front legs, a pair of rear legs with wheels, each front leg being connected to a separate front wheel through an articulated section that is pivotally connected to both the front leg and to a separate front wheel support such that upon articulation of the sections relative to the front legs and the front wheel support to fold the chassis into a compact configuration, the front wheel support and the front wheels are pivoted toward the rear wheels to thereby reduce a length of the chassis when folded, the pair of rear legs is connected to the rear wheels, and a scissor frame and two side cross members that connect the front legs to the rear legs, a locking compass mounted between the rear wheels, and a locking system for preventing articulation of the articulated sections relative to the front legs unless manually released, the locking system includes a retractable projection within each articulated section that is inserted into a lower end of an adjacent front leg, the handlebar being movable relative to the pair of front legs, an inner element within each front leg moves and presses on the retractable projections moving them from the front legs and enabling the folding of the chassis by articulation of the sections.

2. The foldable child's pushchair of claim 1, wherein a lower end of each of the rear legs is articulated to separate side arms by a linking piece, suspension elements mounted between the lower end of each rear leg and a rear wheel support the rear wheel, and the locking compass being mounted between the linking pieces.

* * * * *